United States Patent
Cadima (10) Patent No.: US 11,486,769 B2
(45) Date of Patent: Nov. 1, 2022

(54) TEMPERATURE PROBE FOR A COOKTOP APPLIANCE WITH A GAS BURNER

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc, Wilmington, DE (US)

(*) Notice: Subject to any disclaimer, the term of this patent is extended or adjusted under 35 U.S.C. 154(b) by 357 days.

(21) Appl. No.: 16/703,936

(22) Filed: Dec. 5, 2019

(65) Prior Publication Data
US 2021/0172805 A1  Jun. 10, 2021

(51) Int. Cl.
*G01K 7/00* (2006.01)
*G01K 1/14* (2021.01)
*G01K 1/024* (2021.01)
*F16B 2/10* (2006.01)

(52) U.S. Cl.
CPC ............ *G01K 1/146* (2013.01); *F16B 2/10* (2013.01); *G01K 1/024* (2013.01); *G01K 2207/06* (2013.01)

(58) Field of Classification Search
CPC combination set(s) only.
See application file for complete search history.

(56) References Cited

U.S. PATENT DOCUMENTS

| | | | |
|---|---|---|---|
| 4,324,138 A * | 4/1982 | Davis | G01K 1/026 374/111 |
| 5,118,144 A * | 6/1992 | Garofalo, Jr. | B65D 45/22 220/324 |
| 9,841,191 B2 | 12/2017 | Johncock et al. | |
| 2008/0259995 A1* | 10/2008 | Kuhn | G01K 7/32 374/152 |
| 2010/0128753 A1* | 5/2010 | Claypool | G01K 1/02 374/102 |
| 2010/0229355 A1* | 9/2010 | Wang | F16B 2/10 24/489 |
| 2017/0138797 A1* | 5/2017 | Brown | A47J 27/004 |
| 2017/0280510 A1* | 9/2017 | Kim | A47J 36/321 |
| 2018/0143086 A1 | 5/2018 | Stoufer et al. | |
| 2019/0011304 A1* | 1/2019 | Cunningham | G01F 17/00 |

FOREIGN PATENT DOCUMENTS

| | | | |
|---|---|---|---|
| JP | 2009133501 A | 6/2009 | |
| JP | 4410363 B2 * | 2/2010 | ............... F24C 3/12 |
| JP | 4410363 B2 | 2/2010 | |
| JP | 6109207 B2 | 4/2017 | |

* cited by examiner

Primary Examiner — Lisa M Caputo
Assistant Examiner — Nasir U. Ahmed
(74) Attorney, Agent, or Firm — Dority & Manning, P.A.

(57) ABSTRACT

A temperature probe for a cooktop appliance includes a resilient clip configured for mounting on a cooking utensil with a module connected to the resilient clip and a temperature sensor extending from the module along a longitudinal direction. The resilient clip may include a hook portion configured to engage a rim of the cooking utensil and an offset portion that is not parallel to the hook portion. The temperature probe may include an emitter and a receiver for non-contact measurement of a diameter of the cooking utensil.

17 Claims, 8 Drawing Sheets

TEMPERATURE PROBE FOR A COOKTOP APPLIANCE WITH A GAS BURNER

FIELD OF THE INVENTION

The present subject matter relates generally to cooktop appliances with gas burners, such as gas range appliances or gas stove appliances.

BACKGROUND OF THE INVENTION

Certain cooktop appliances include gas burners for heating cooking utensils on the cooktop appliances. Some users prefer gas burners over electric heating elements due to the adjustability of gas burners. In particular, a gas burner's control valve can provide more heat outputs compared to the discrete number of output settings available for electric heating elements. However, precisely heating a cooking utensil with a gas burner can be difficult. For example, a user may have to constantly monitor the cooking utensil and tweak the control valve to maintain a particular temperature in the cooking utensil, and such monitoring and adjustment can be tedious.

Providing automated heating with a gas burner also presents difficulties. For example, the appropriate operating range, such as heat output from the gas burner, may vary depending on the size of the cooking utensil. A smaller cooking utensil, relative to the size or output of the gas burner, may not be suitable for use with the upper portion of the gas burner's operating range.

Accordingly, a cooktop appliance with features for operating a gas burner to maintain a particular temperature in a cooking utensil while also operating the gas burner within an appropriate range for the cooking utensil would be useful.

BRIEF DESCRIPTION OF THE INVENTION

Aspects and advantages of the invention will be set forth in part in the following description, or may be apparent from the description, or may be learned through practice of the invention.

In one example embodiment of the present disclosure, a temperature probe for a cooktop appliance is provided. The temperature probe includes a resilient clip. The resilient clip includes a hook portion configured to engage a rim of a cooking utensil and an offset portion that is not parallel to the hook portion. The temperature probe further includes a module connected to the resilient clip. A temperature sensor extends from the module along a longitudinal direction. The temperature probe also includes a wireless communication module configured for wireless communication with a controller of the cooktop appliance.

In another example embodiment of the present disclosure, a temperature probe for a cooktop appliance is provided. The cooktop appliance includes a gas burner, a control valve coupled to the gas burner to regulate a flow of fuel to the gas burner, and a controller in communication with the control valve. The temperature probe includes a resilient clip configured for mounting on a cooking utensil at a first side of the cooking utensil. The temperature probe further includes a module connected to the resilient clip. A temperature sensor extends from the module along a longitudinal direction. The temperature probe also includes an emitter configured to emit a wave from the module towards a second side of the cooking utensil opposite the first side of the cooking utensil and a receiver configured to receive a reflection of the wave from the second side of the cooking utensil. The temperature probe further includes a wireless communication module configured for wireless communication with the controller of the cooktop appliance, wherein the wireless communication module is configured to transmit a difference between the emitted wave and the received reflection to the controller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
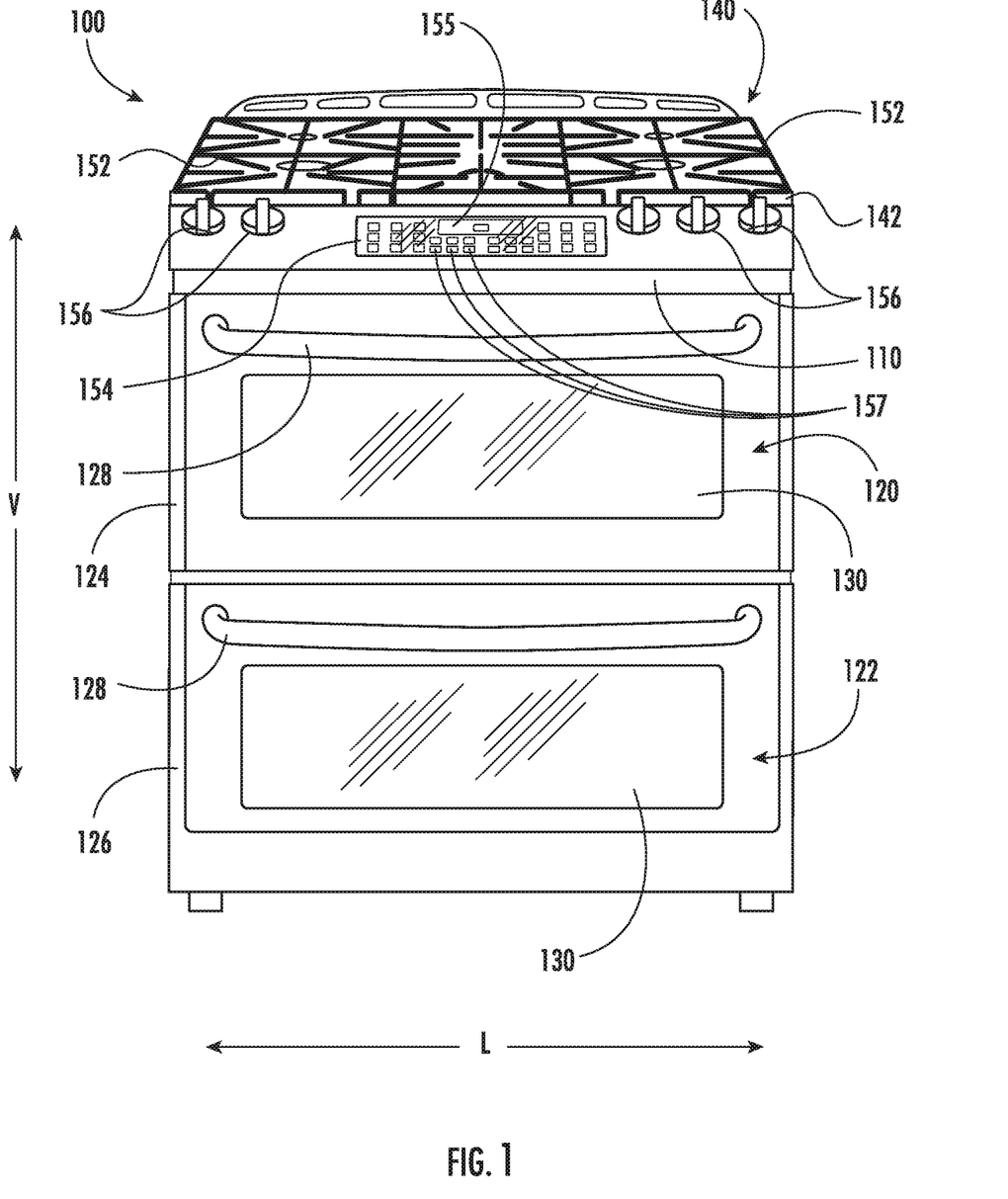
FIG. 1 provides a front, perspective view of a cooktop appliance which may be used with a temperature probe according to one or more embodiments of the present subject matter.
Figure 2:
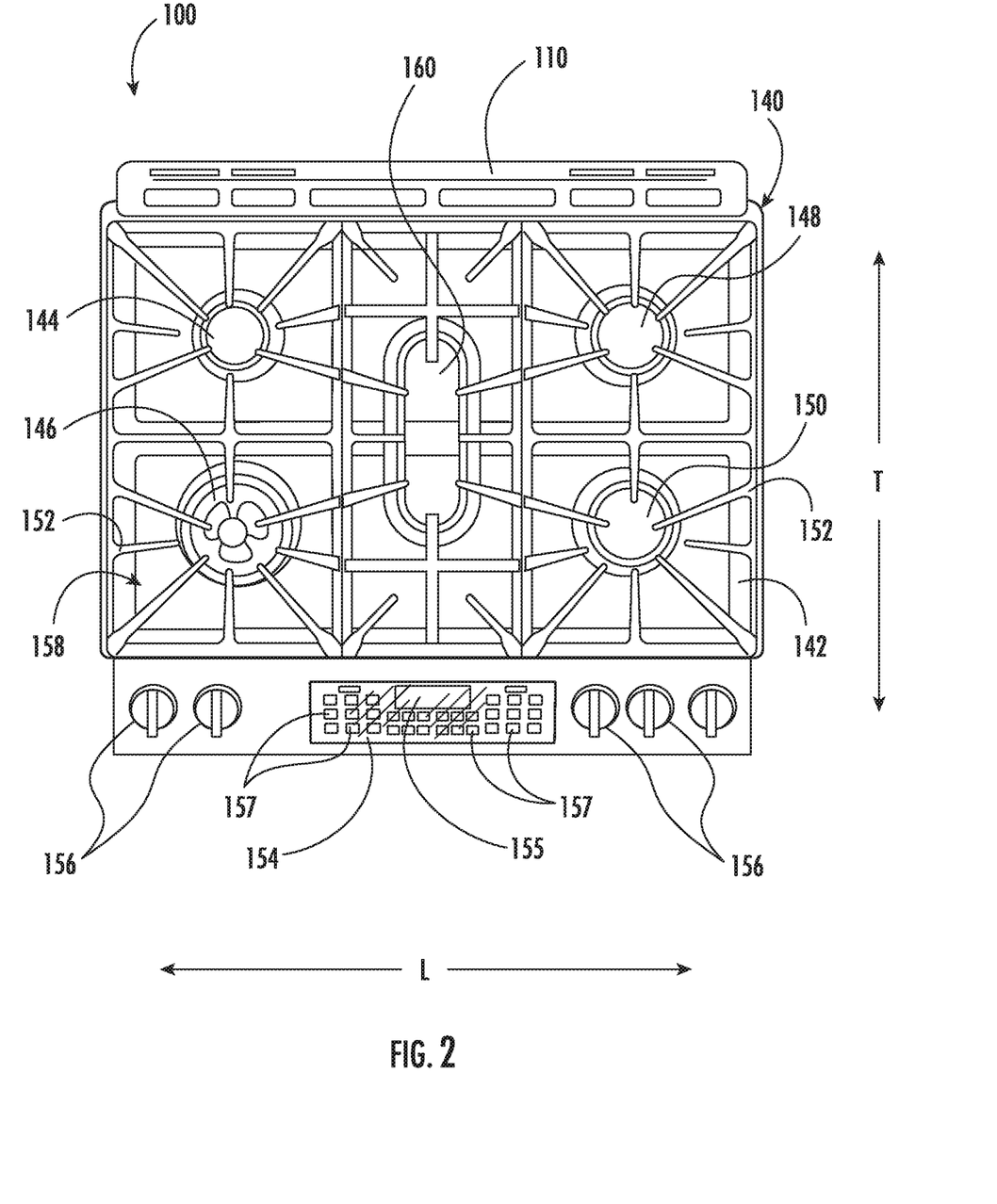
FIG. 2 provides a top, overhead view of the example range appliance of FIG. 1.

FIG. 1 provides a front, perspective view of a range appliance 100 as may be employed with the present subject matter. FIG. 2 provides a top, overhead view of range appliance 100. Range appliance 100 includes an insulated cabinet 110. Cabinet 110 defines an upper cooking chamber 120 and a lower cooking chamber 122. Thus, range appliance 100 is generally referred to as a double oven range appliance. As will be understood by those skilled in the art, range appliance 100 is provided by way of example only, and the present subject matter may be used in any suitable cooktop appliance, e.g., a single oven range appliance or a standalone cooktop appliance. Thus, the example embodiment shown in FIG. 1 is not intended to limit the present subject matter to any particular cooking chamber configuration or arrangement (or even the presence of a cooking chamber at all, e.g., as in the case of a standalone cooktop appliance).

Upper and lower cooking chambers 120 and 122 are configured for the receipt of one or more food items to be cooked. Range appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass window panes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Range appliance 100 also includes a cooktop 140. Cooktop 140 is positioned at or adjacent a top portion of cabinet 110. Thus, cooktop 140 is positioned above upper and lower cooking chambers 120 and 122. Cooktop 140 includes a top panel 142. By way of example, top panel 142 may be constructed of glass, ceramics, enameled steel, and combinations thereof.

Figure 4:
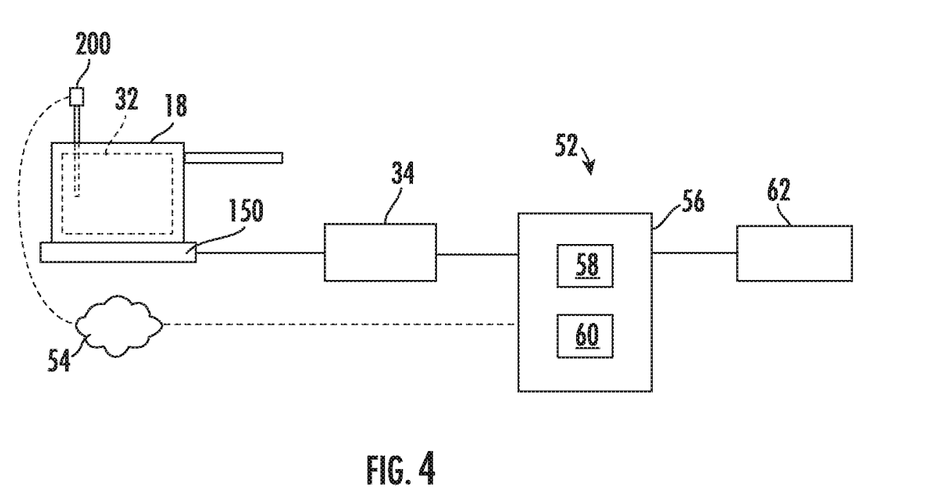
FIG. 4 provides a schematic diagram of a control system, including a temperature probe, as may be used with the exemplary cooktop appliance of FIG. 1.

For range appliance 100, a utensil 18 holding food and/or cooking liquids (e.g., oil, water, etc., where the food and/or cooking liquids are schematically represented at 32 in FIG. 4) may be placed onto grates 152 at a location of any of burners 144, 146, 148, 150. Burners 144, 146, 148, 150 provide thermal energy to cooking utensils on grates 152. As shown in FIG. 2, burners 144, 146, 148, 150 can be configured in various sizes so as to provide e.g., for the receipt of cooking utensils (i.e., pots, pans, etc.) of various sizes and configurations and to provide different heat inputs for such cooking utensils. Grates 152 are supported on a top surface 158 of top panel 142. Range appliance 100 also includes a griddle burner 160 positioned at a middle portion of top panel 142, as may be seen in FIG. 2. A griddle may be positioned on grates 152 and heated with griddle burner 160.

A user interface panel 154 is located within convenient reach of a user of the range appliance 100. For this example embodiment, user interface panel 154 includes knobs 156 that are each associated with one of burners 144, 146, 148, 150 and griddle burner 160. Knobs 156 allow the user to activate each burner and determine the amount of heat input provided by each burner 144, 146, 148, 150 and griddle burner 160 to a cooking utensil located thereon. The user interface panel 154 may also include one or more inputs 157, such as buttons or a touch pad, for selecting or adjusting operation of the range appliance 100, such as for selecting or initiating a precision cooking mode, as will be described in more detail below. User interface panel 154 may also be provided with one or more graphical display devices 155 that deliver certain information to the user such as e.g., whether a particular burner is activated and/or the temperature at which the burner is set.

Although shown with knobs 156, it should be understood that knobs 156 and the configuration of range appliance 100 shown in FIG. 1 is provided by way of example only. More specifically, user interface panel 154 may include various input components, such as one or more of a variety of touch-type controls, electrical, mechanical or electro-mechanical input devices including rotary dials, push buttons, and touch pads. The user interface panel 154 may include other display components, such as a digital or analog display device 155, designed to provide operational feedback to a user.

Figure 3:
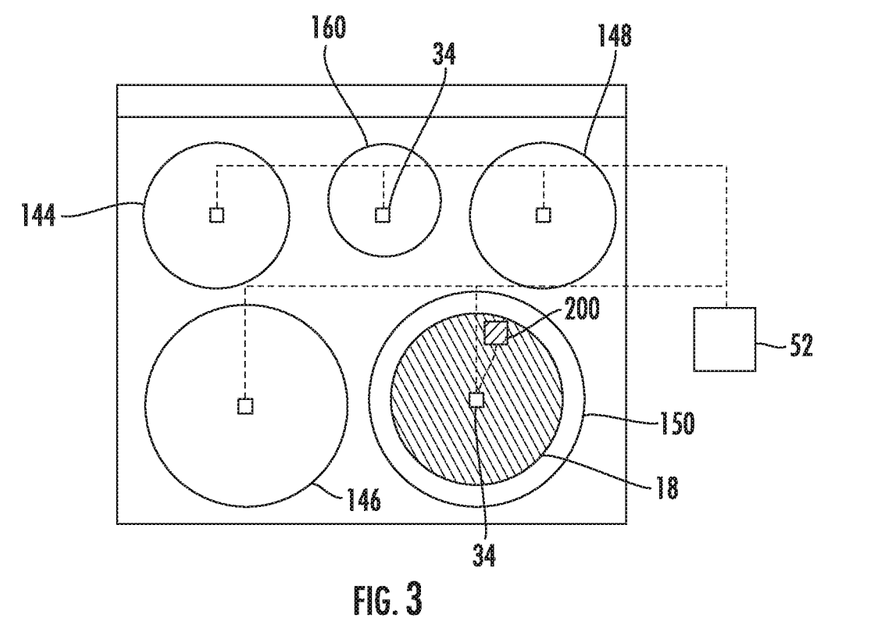
FIG. 3 provides a top, schematic view of the exemplary cooktop appliance of FIG. 1.

FIG. 3 is a schematic view of certain components of range appliance 100. In particular, as shown in FIG. 3, range appliance 100 includes five heating elements (burners) 144, 146, 148, 150, and 160, spaced along the cooktop 140. A cooking utensil 18, also depicted schematically, is positioned on a first heating element 150 of the plurality of heating elements by way of example. An example temperature probe 200 is schematically depicted within the utensil 18.

Still referring to FIG. 3, the range appliance 100 may include a fuel supply system including one or more control valves 34, such as a control valve 34 associated with, e.g., connected to, each burner 144, 146, 148, 150, and 160. The fuel supply system may include a supply line and each control valve 34 may be connected to the supply line, such as fluidly coupled to the supply line, to selectively provide fluid communication from the supply line to the respective burner. The supply line may be a metal tube, such as copper or aluminum tubing, that is connectable to a fuel supply. Thus, the supply line may receive a flow of pressurized gaseous fuel, e.g., natural gas or propane, from the fuel supply. When the corresponding control valve 34 is opened, the gaseous fuel may thereby flow from the fuel supply to the respective burner through the supply line. Such tubing and supply lines generally are understood by those of ordinary skill in the art and, as such, are not specifically illustrated for sake of clarity.

As may be seen in FIGS. 3 and 4, the control valves 34 may each be connected to and in operative communication with a controller 52 of the range appliance 100. Each control valve 34 may be an electronic pressure regulating valve, a motorized valve, a modulating valve, a solenoid valve, or some other variable type gas flow valve. Thus, each control valve 34 may be automatically adjusted, e.g., by the controller 52, to regulate the flow of gaseous fuel to the corresponding burner 144, 146, 148, 150, or 160.

As best seen in FIG. 4, the controller 52 may generally include a computing device 56 having one or more processor(s) 58 and associated memory device(s) 60. The computing device 56 may be configured to perform a variety of computer-implemented functions to control the exemplary cooktop appliance 12. The computing device 56 can include a general purpose computer or a special purpose computer, or any other suitable computing device, such as general or special purpose microprocessors operable to execute programming instructions or micro-control code associated with operation of range appliance 100. It should be appreciated, that as used herein, the processor 58 may refer to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory can be a separate component from the processor or can be included onboard within the processor. The memory 60 can store information accessible by processor(s) 58, including instructions that can be executed by processor(s) 58. For example, the instructions can be software or any set of instructions that when executed by the processor(s) 58, cause the processor(s) 58 to perform operations. For the embodiment depicted, the instructions may include a software package configured to operate the system to, e.g., execute the exemplary methods described below. Alternatively, controller 52 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

As illustrated in FIG. 4, the range appliance 100 may also include a user interface 62 operably connected to the controller 52. User interface 62 may correspond to user interface panel 154 in certain example embodiments. In such example embodiments, user interface 62 may be positioned on top panel 142 and may be in communication with controller 52 via a wiring harness. However, in other exemplary embodiments, the user interface 62 may additionally, or alternatively, be wirelessly connected to the controller 52 via one or more suitable wireless communication networks (such as the exemplary wireless communication network 54 described below). As an example, user interface 62 may correspond to an application on a smartphone or other remote device, and the user may utilize the application to, e.g., establish a set temperature for one of the gas burners 144, 146, 148, 150, or 160. In such example embodiments, user interface 62 may be in wireless communication with controller 52, e.g., via a Bluetooth® or Wi-Fi® connection.

Thus, the range appliance 100 may include the controller 52, and the controller 52 may regulate various components of range appliance 100. Controller 52 may be in operative communication with various components of range appliance 100, such as user interface 154, including the inputs 157 and display 155 thereon, control valves 34, and/or a temperature probe 200. For example, as mentioned, controller 52 may adjust a corresponding control valve 34 in order to regulate the flow of gaseous fuel to an associated burner 144, 146, 148, 150, or 160. Signals may be routed between controller 52 and the various operational components of range appliance 100. Thus, controller 52 can selectively activate and operate these various components. Various components of range appliance 100 are communicatively coupled with controller 52 via one or more communication lines, such as, e.g., signal lines, shared communication busses, or wirelessly.

Controller 52 is also in communication with temperature probe 200. Temperature probe 200 is separate from burner 150, and temperature probe 200 is configured to measure a temperature at the utensil 18 heated by burner 150. Controller 52 receives temperature measurements from temperature probe 200. For example, controller 52 and temperature probe 200 may each include a wireless transmitter/receiver such that controller 52 and temperature probe 200 communicate with each other wirelessly, e.g., via a Bluetooth® or Wi-Fi® connection. As an example of wireless communication, the temperature probe 200 may be configured as a wireless sensor in wireless communication with the controller 52 via a wireless communications network 54. In certain exemplary embodiments, the wireless communications network 54 may be a wireless sensor network (such as a Bluetooth communication network), a wireless local area network (WLAN), a point-to point communication networks (such as radio frequency identification networks, near field communications networks, etc.), or a combination of two or more of the above communications networks.

Figure 5:
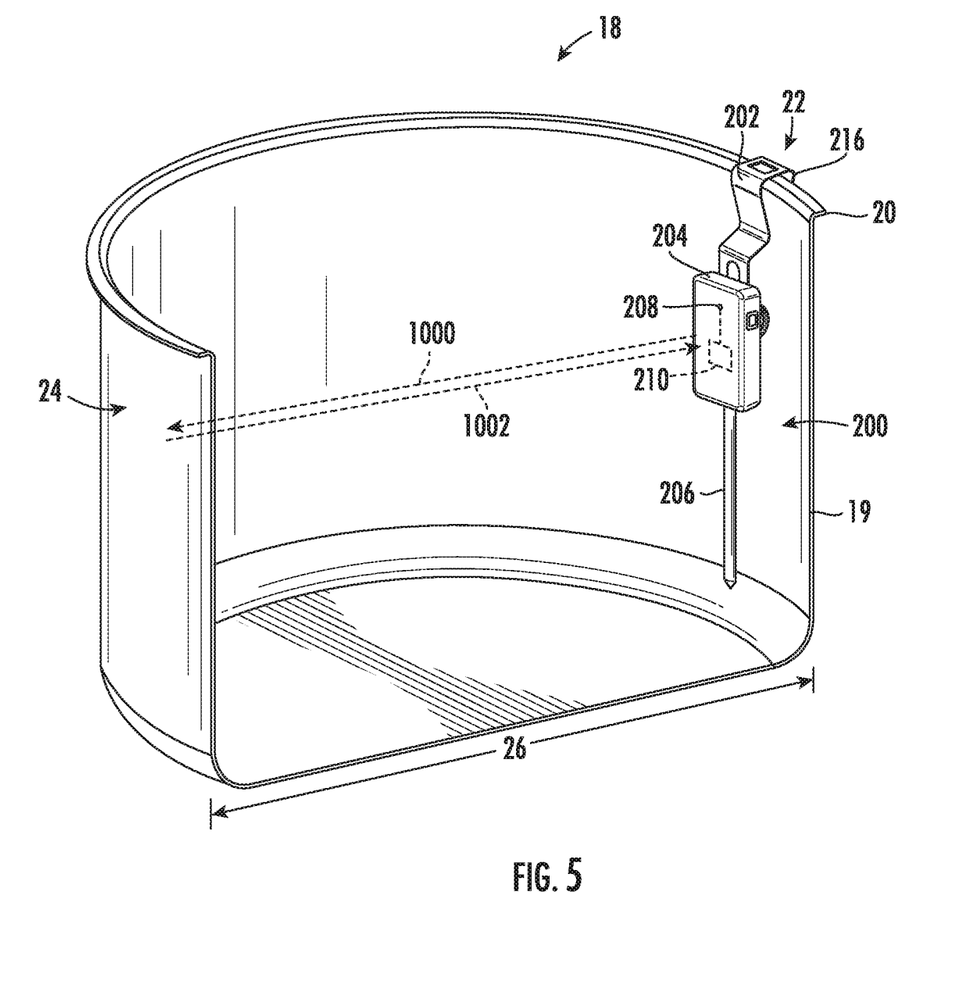
FIG. 5 provides a section view of an exemplary cooking utensil with an exemplary temperature probe according to one or more embodiments of the present subject matter therein.

Turning now to FIG. 5, a perspective view of an exemplary cooking utensil 18 is provided, with a portion of the cooking utensil 18 cut away to reveal the temperature probe 200 mounted on the cooking utensil and predominantly (e.g., other than a portion of a resilient clip 202 of the temperature probe 200) disposed within the cooking utensil 18. As may be generally seen throughout FIGS. 5-10, the temperature probe 200 may include the resilient clip 202, a module 204 connected to the resilient clip 202, and a temperature sensor 206 extending from the module 204. The resilient clip 202 may be configured for mounting on the cooking utensil 18, such as by engaging a rim 20 of the cooking utensil 18, e.g., at a top or upper edge of a side wall 19 of the cooking utensil 18. The resilient clip 202 may be constructed of spring steel or any other suitable resilient material.

In some embodiments, the temperature probe 200 may be configured for non-contact measurement of a diameter 26 of the cooking utensil 18. For example, as illustrated in FIG. 5, the temperature probe 200 may be mountable on the cooking utensil 18, e.g., at a first side 22 of the cooking utensil 18, and the temperature probe 200 may include an emitter 208 configured to emit a wave 1000 from the module 204 towards a second side 24 of the cooking utensil 18 opposite the first side 22 of the cooking utensil 18. The temperature probe 200 may further include a receiver 210 configured to receive a reflection 1002 of the wave from the second side 24 of the cooking utensil 18. In various embodiments, the wave 1000 may be any suitable wave for non-contact measurement of the diameter 26 of the cooking utensil, such as a sound wave or an electromagnetic wave. For example, the wave 1000 may be an electromagnetic wave such as an infrared light wave, e.g., a laser beam or pulse. As another example, the wave 1000 may be a radio wave.

Figure 6:
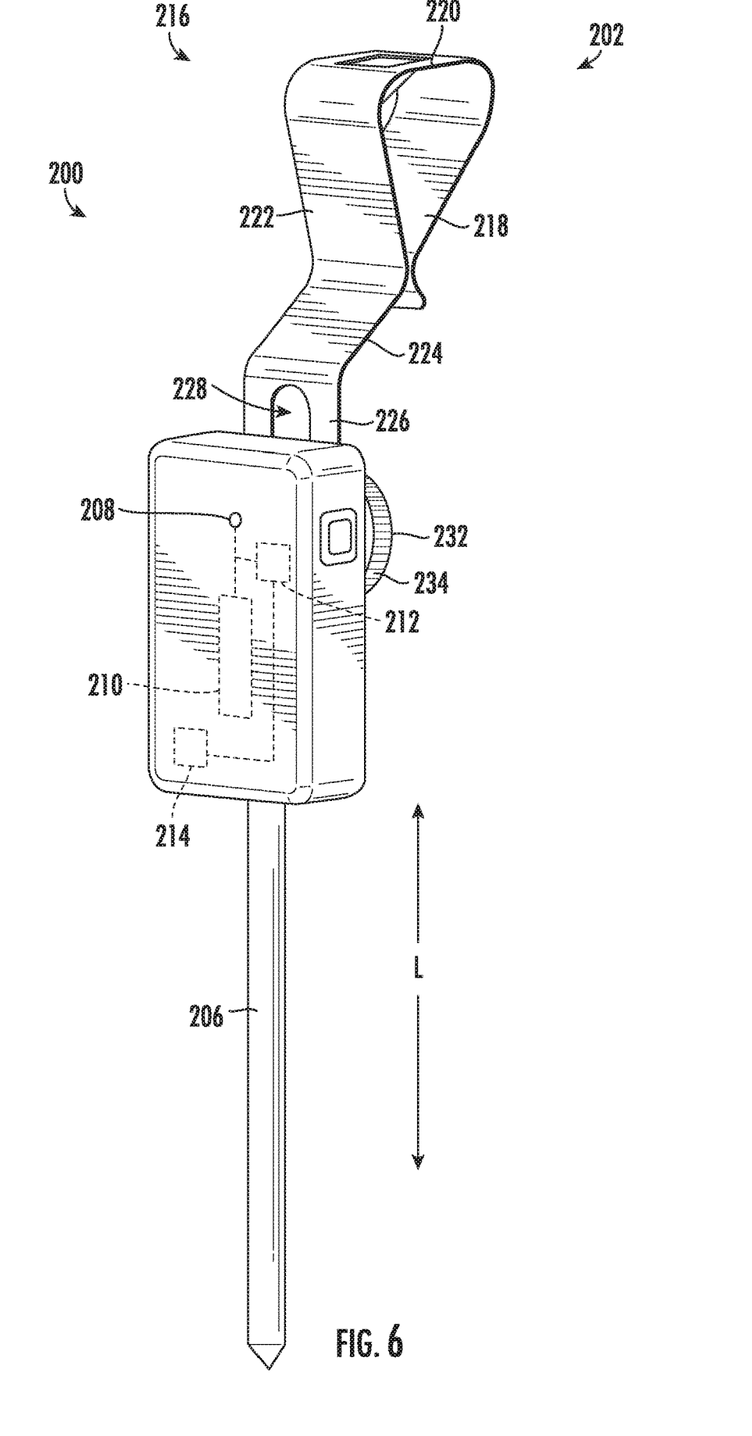
FIG. 6 provides a front perspective view of an exemplary temperature probe according to one or more embodiments of the present subject matter.

As may be seen in FIG. 6, the temperature probe 200 may include a controller 212 which is operably connected to various other components of the temperature probe 200. For example, the controller 212 may be operatively connected to the emitter 208 and the receiver 210. The controller 212 of the temperature probe 200 may generally include a computing device having one or more processor(s) and associated memory device(s), etc., similar to the controller 52 of the cooktop appliance 100, as described above.

The temperature probe 200 may also include a wireless communication module 214. The wireless communication module 214 may be configured for wireless communication with the cooktop appliance 100, such as with the controller 52 thereof. The controller 212 of the temperature probe 200 may also be operatively connected to the wireless communication module 214, whereby the temperature probe 200 may transmit and receive signals to and from the cooktop appliance 100. In some embodiments, the controller 212 of the temperature probe 200 may be configured to determine, e.g., calculate, the diameter 26 of the cooking utensil 18 based on a difference between the emitted wave 1000 from the emitter 208 and the received reflection 1002 received by the receiver 210. In such embodiments, the controller 212 may further be configured to transmit the determined diameter 26 of the cooking utensil 18 to the cooktop appliance 100, e.g., via the wireless communications module 214. In other embodiments, the controller 212 may be configured to transmit the difference between the emitted wave 1000 and the received reflection 1002 to the cooktop appliance 100. In such embodiments, the controller 52 of the cooktop appliance 100 may be configured to determine the diameter 26 of the cooking utensil 18 based on the difference between the emitted wave 1000 and the received reflection 1002.

In some embodiments, the difference between the emitted wave 1000 and the received reflection 1002 may be a time difference. In such embodiments, the controller 212 of the temperature probe 200 and/or the controller 52 of the cooktop appliance 100 may be configured to determine the diameter 26 of the cooking utensil 18 based on the time of flight of the wave 1000.

In some embodiments, the difference between the emitted wave 1000 and the received reflection 1002 may be a phase shift. In such embodiments, the controller 212 of the temperature probe 200 and/or the controller 52 of the cooktop appliance 100 may be configured to determine the diameter 26 of the cooking utensil 18 based on the phase shift, e.g., based on a difference between a phase angle of the initial wave 1000 and a phase angle of the reflection 1002.

In various embodiments, the diameter 26 of the cooking utensil 18 may be used to determine an upper limit for the flow of fuel to the burner 150 via the control valve 34. For example, the upper limit for the flow of fuel to the burner 150 via the control valve 34 may be based on the diameter 26 of the cooking utensil 18. In particular, when the diameter 26 of the cooking utensil 18 is undersized compared to a size or power level of the burner 150, the upper limit for the flow of fuel to the burner 150 may be less than a maximum possible or capable flow of fuel to the burner 150, e.g., the maximum possible flow of fuel may be the highest volumetric flow rate of fuel which the control valve 34 is capable of providing or permitting to the burner 150. For example, the control valve 34 may be movable from a zero percent position (closed) to a one hundred percent position (open), with a variety of intermediate positions between the closed position and the open position, such that the upper limit based on the diameter 26 of the cooking utensil 18 may be or correspond to an intermediate position of the control valve 34 which is less than the fully open position of the control valve 34, such as a seventy-five percent position or a ninety percent position. The foregoing description of a zero to one hundred range is by way of example only. For instance, the control valve 34 may, in some embodiments, be actuated by a stepper motor with a range of possible positions on the order of five to ten thousand possible positions.

It should be understood that the "size" or "power level" of the burner 150 is used herein to refer to the maximum heat and/or flame output of which the burner 150 is capable or for which the burner 150 is configured. For example, the size or power level of the burner 150 may correspond to, e.g., be proportional to, the physical dimensions of the burner 150, such as the outer perimeter, e.g., diameter, of the burner 150 as well as the size and spacing of flame ports defined generally along the outer perimeter. For instance, in embodiments where the burner 150 is annular (i.e., ring-shaped), including multi-ring burners, the size or power level of the burner 150 may correspond to, e.g., be proportional to, the outer diameter or outermost diameter of the outermost ring of a multi-ring burner. The actual flame size produced by the burner 150 may vary from operation to operation based on, e.g., the cookware used and the ambient air flow, among other factors. However, it is understood that a certain minimum size, e.g., diameter 26, is recommended for the cooking utensil 18 to be compatible with the burner 150, e.g., to allow an adequate factor of safety in the possible heat and/or flame output from the burner 150 relative to the size of the cooking utensil. Thus, as described above, when a cooking utensil 18 is incompatible with, e.g., too small for, the burner 150 based on the maximum possible output of the burner 150, the output of the burner 150 may be constrained by the upper limit for the flow of fuel to the burner 150.

Figure 7:
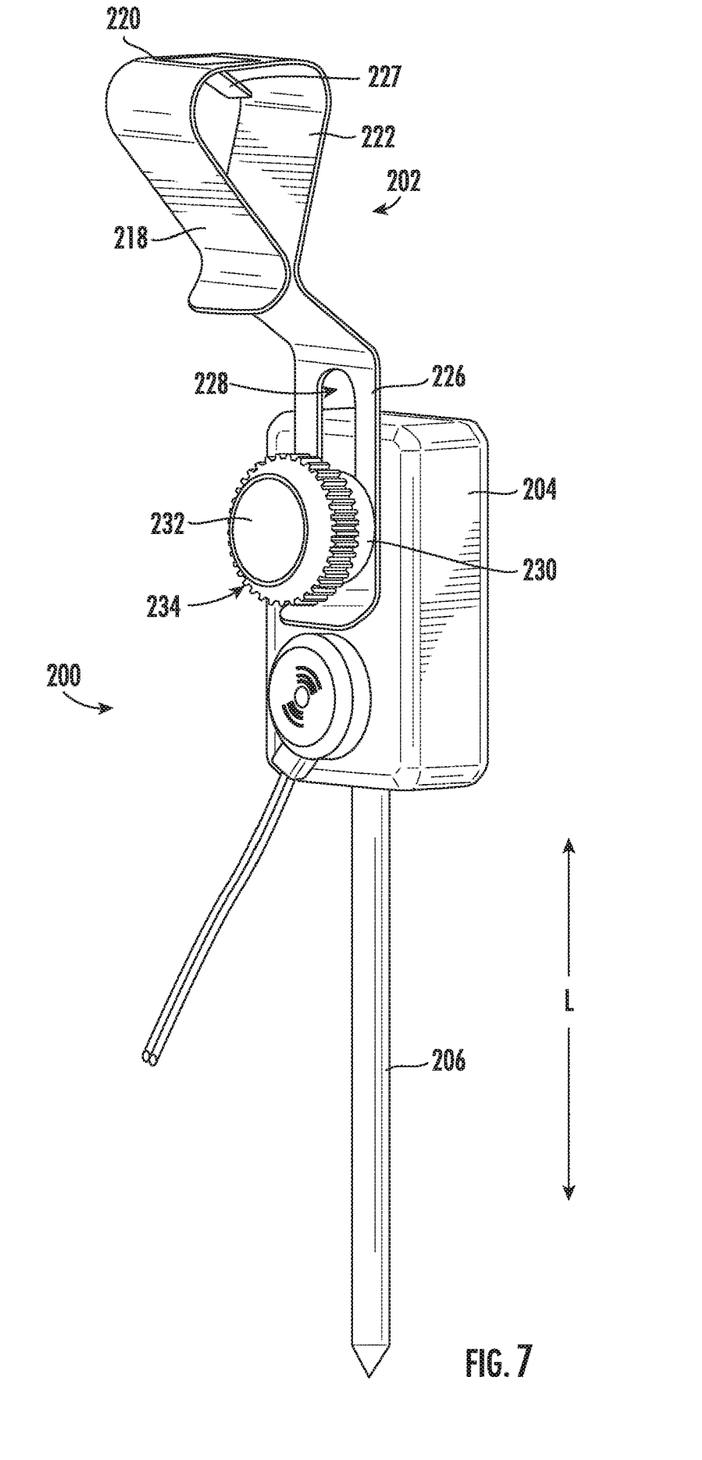
FIG. 7 provides a back perspective view of an exemplary temperature probe according to one or more embodiments of the present subject matter.
Figure 8:
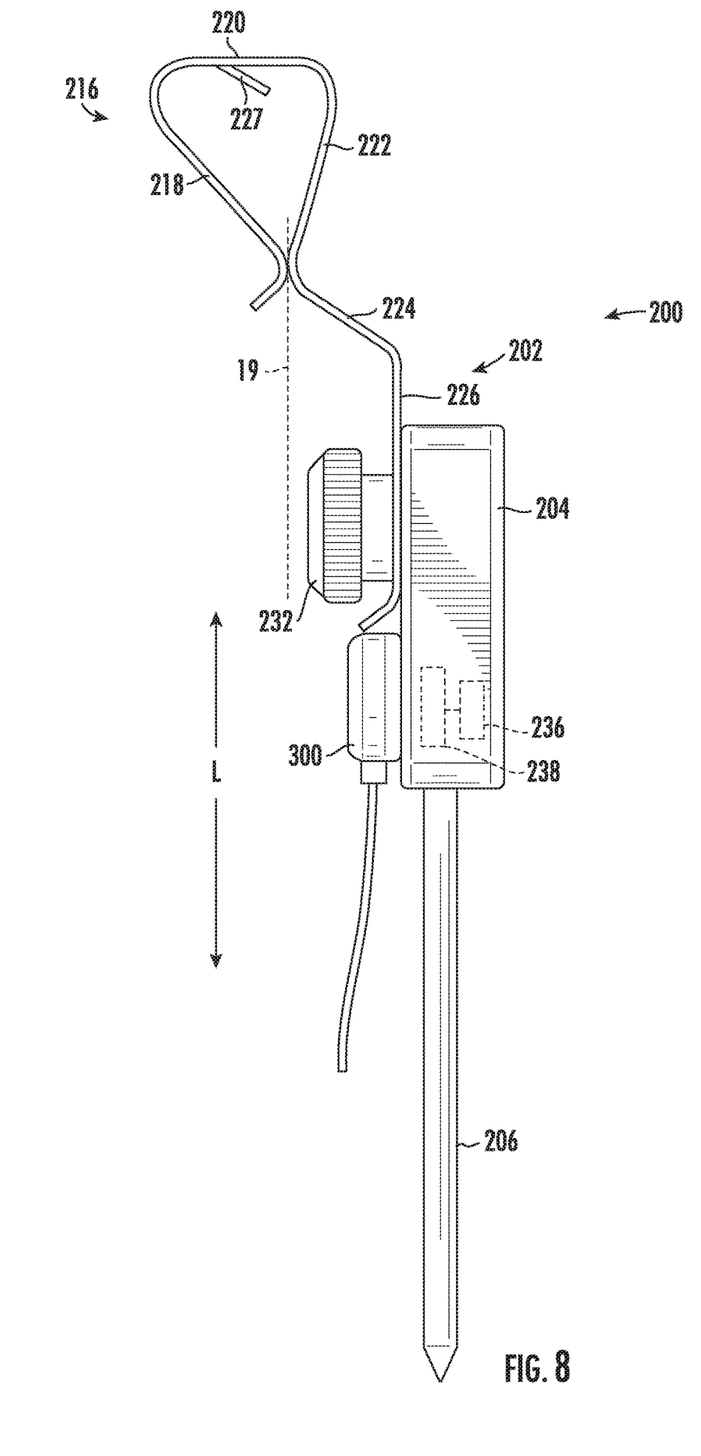
FIG. 8 provides a side view of an exemplary temperature probe according to one or more embodiments of the present subject matter.

As best seen in FIGS. 6 through 8, the temperature sensor 206 may extend along and/or define a longitudinal direction L. In certain exemplary embodiments, the temperature sensor 206 may utilize any suitable technology for sensing/determining a temperature of food or other substances, e.g., water such as a sous vide bath, 32 (FIG. 4) positioned in the cooking utensil 18. For example, the temperature sensor 206 may utilize one or more thermocouples, thermistors, optical temperature sensors, infrared temperature sensors, etc. Alternatively, however, the temperature sensor 206 may be configured to determine a temperature of one or more items 32 positioned within the cooking utensil 18 in any other suitable manner.

Also as may be seen in FIGS. 5 through 8, the resilient clip 202 may include a hook portion 216 configured to engage the rim 20 (FIG. 5) of the cooking utensil 18. The hook portion 216 may include an external segment 218 which is configured to engage an exterior side of the utensil 18 and an internal segment 222 opposite the external segment 218 which is configured to engage an interior side of the cooking utensil 18. In some embodiments, the external segment 218 and the internal segment 222 may be directly connected to each other. In other embodiments, such as the example embodiments illustrated in FIGS. 6 through 8, the hook portion 216 of the resilient clip 202 may include a spanning segment 220 between the external segment 218 and the internal segment 222. For example, the spanning segment 220 may be directly connected to each of the external segment 218 and the internal segment 222. The spanning segment 220 may extend from one of the external segment 218 and the internal segment 222 to the other of the external segment 218 and the internal segment 222, such as generally along a transverse direction that is perpendicular to the longitudinal direction. The spanning segment 220 may be configured to span across the rim 20 of the cooking utensil 18 when the resilient clip 202 engages the cooking utensil, as generally seen in FIG. 5. As best seen in FIG. 8, the resilient clip 202 may also include an inwardly projecting finger 227 which is configured to engage with the rim 20 of the cooking utensil 18 and thereby stabilize the temperature probe 200 on the utensil 18.

The resilient clip 202 may also include an offset portion 224 that is not parallel, e.g., is oblique or perpendicular, to the hook portion 216. As illustrated in FIG. 8, the hook portion 216 may be configured to engage the wall 19 of the cooking utensil 18 with the wall 19 between the external segment 218 and the internal segment 222 of the hook portion 216, e.g., where the general position of the wall 19 of the cooking utensil 18 is represented by a dashed line in FIG. 8, and the offset portion 224 may extend at an angle, such as an oblique angle or a right angle, from the hook portion 216 whereby the module 204 and the temperature sensor 206 of the temperature probe 200 are spaced apart from the wall 19 within the interior of the cooking utensil 18.

The position, e.g., height, of the temperature probe 200 within the cooking utensil 18 may be adjustable. In particular, the module 204 and the temperature sensor 206 may be adjustable relative to the resilient clip 202, where the resilient clip 202 is engaged with the wall 19 and rim 20 of the cooking utensil 18, such that adjusting the module 204 and the temperature sensor 206 relative to the resilient clip 202 allows the temperature sensor 206 to be selectively located at one of several possible positions within the cooking utensil 18. For example, the temperature sensor 206 may be selectively positionable to provide good contact with the items 32 (FIG. 4) within the cooking utensil 18 for measuring or sensing a temperature of the items 32. In some embodiments, resilient clip 202 may include a connecting portion 226, e.g., extending along the longitudinal direction L and/or generally parallel to a major dimension of the module 204. The module 204 may be connected to the resilient clip 202 by a threaded fastener 230 extending through a slot 228 in the connecting portion 226 of the resilient clip 202. In some embodiments, the threaded fastener 230 may include a knob 232 extending away from the module 204 along a direction perpendicular to the longitudinal direction L, such as a transverse direction. The knob 232 may be configured to promote ease of engagement or manipulation of the knob 232, such as with a knurled surface 234 thereon. For example, the knurled surface 234 may extending circumferentially around the knob 232.

Figure 9:
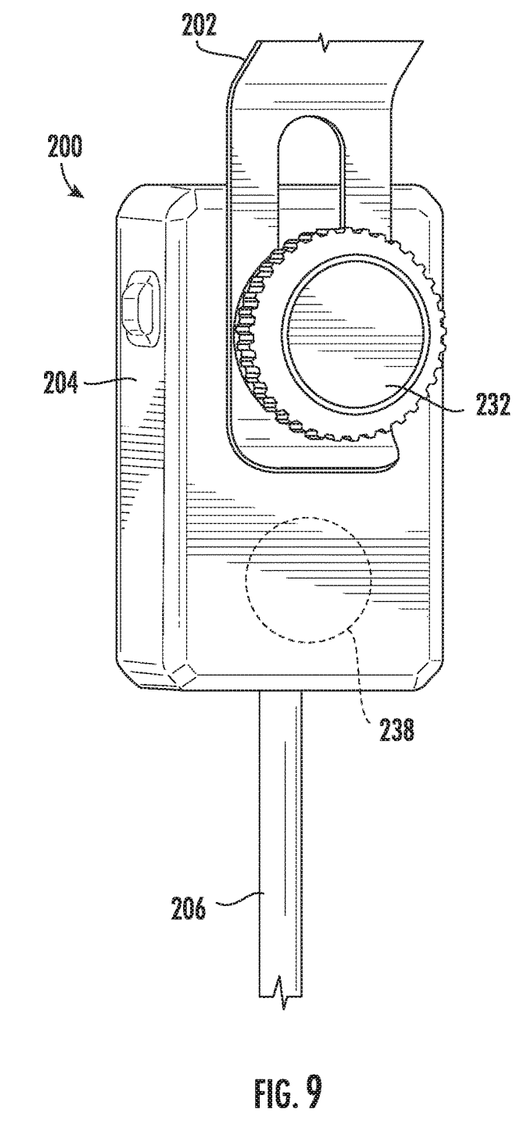
FIG. 9 provides an enlarged back perspective view of a portion of an exemplary temperature probe according to one or more embodiments of the present subject matter.
Figure 10:
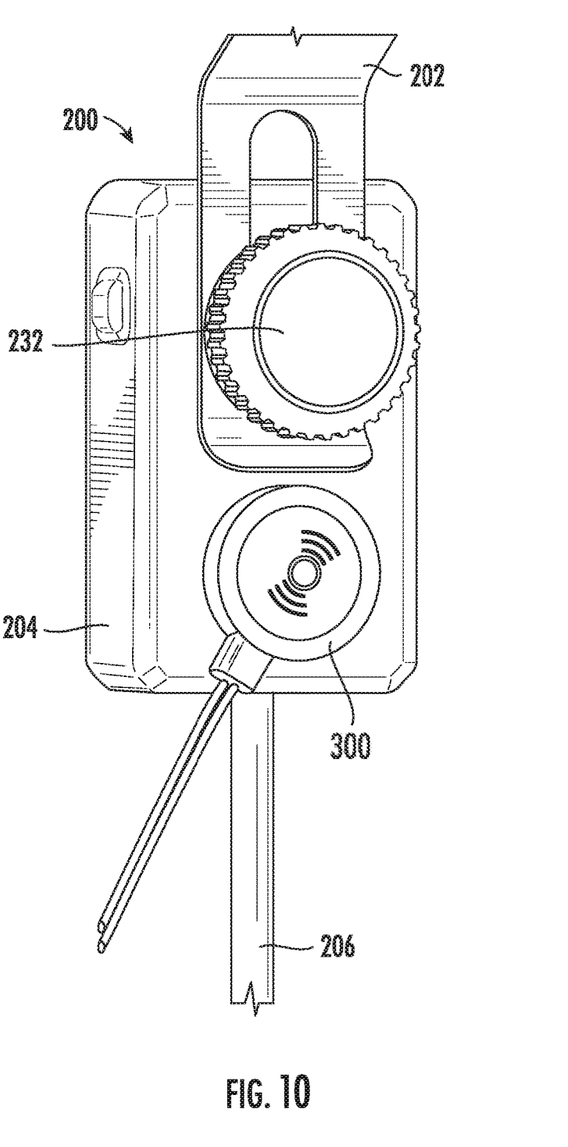
FIG. 10 provides a view of the portion of the exemplary temperature probe of FIG. 9 with a wireless charger connected thereto.

As best seen in FIGS. 9 and 10, the module 204 may be sealed, e.g., in order to protect electronic components of the temperature probe 200 therein, such as the controller 212, etc. In some embodiments, the module 204 may be hermetically sealed. For example, the module 204 may comprise a substrate or base material, such as metal or plastic, with an overmolded elastomeric material on top of and around the base material to promote sealing of the module 204. The overmolded elastomeric material may be, e.g., silicon rubber. In some embodiments, the temperature probe 200 may also include a battery 236 and an inductive charging coil 238 electrically coupled to the battery 236 for wirelessly charging the battery 236. For example, the inductive charging coil 238 may provide an electrical charge to the battery when wirelessly coupled with an inductive charger 300 (see, e.g., FIGS. 8 and 10). Providing the inductive charging coil 238 may promote hermetic sealing of the module 204, e.g., by avoiding a charging port which would of necessity extend through the overmolded material.

According to various embodiments of the present disclosure, the range appliance 100 may be configured for a precision cooking mode and/or methods of operating the range appliance 100 may include precision cooking mode. Precision cooking mode generally includes a closed-loop control algorithm used to automatically (e.g., without user input such as adjusting the knob(s) 156) adjust the flow of gas to one or more of the burners 144, 146, 148, 150 and griddle burner 160. Utilizing temperature measurements from temperature probe 200, controller 52 may adjust the corresponding control valve 34 for the respective burner on which the utensil 18 is located, e.g., the control valve 34 connected to burner 150 in the illustrated example, and regulate the flow of gaseous fuel to, e.g., burner 150. For example, the user may turn on the closed loop control system by initiating precision cooking mode, such as by pressing a corresponding one of the inputs 157 on the user interface 154. Other inputs 157 of the user interface 154 may be used to input a user-defined set temperature or target temperature for the cooking operation. Notably, the precision cooking operation may be constrained by or in response to data from the temperature probe 200. For example, the output of the closed-loop algorithm may be modified or limited by the upper limit for the flow of fuel to the burner 150 which is determined based on the diameter of the cooking utensil 18, as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A temperature probe for a cooktop appliance, the cooktop appliance comprising a cabinet, a gas burner, a control valve coupled to the gas burner to regulate a flow of fuel to the gas burner, and a controller in the cabinet, the controller in communication with the control valve, the temperature probe comprising:
   a resilient clip configured for mounting on a cooking utensil at a first side of the cooking utensil;
   a module connected to the resilient clip;
   a temperature sensor extending from the module along a longitudinal direction;
   an emitter configured to emit a wave from the module towards a second side of the cooking utensil opposite the first side of the cooking utensil;
   a receiver configured to receive a reflection of the wave from the second side of the cooking utensil;
   a wireless communication module configured for wireless communication with the controller of the cooktop appliance, wherein the wireless communication module is configured to transmit a difference between the emitted wave and the received reflection to the controller;
   a battery; and
   an inductive charging coil electrically coupled to the battery for wirelessly charging the battery.

2. The temperature probe of claim 1, wherein the controller of the cooktop appliance is configured to determine a diameter of the cooking utensil based on the difference between the emitted wave and the received reflection and to determine an upper limit for the flow of fuel to the burner via the control valve based on the diameter of the cooking utensil.

3. The temperature probe of claim 1, wherein the difference between the emitted wave and the received reflection is a time difference, and the controller is configured to determine the diameter of the cooking utensil based on the time of flight of the wave.

4. The temperature probe of claim 1, wherein the difference between the emitted wave and the received reflection is a phase shift, and the controller is configured to determine the diameter of the cooking utensil based on the phase shift.

5. The temperature probe of claim 1, wherein the resilient clip comprises a hook portion configured to engage a rim of the cooking utensil at the first side of the cooking utensil and an offset portion oblique to the hook portion.

6. The temperature probe of claim 1, wherein the resilient clip comprises a spring steel material.

7. The temperature probe of claim 1, wherein the module is connected to the resilient clip by a threaded fastener, the threaded fastener comprising a knob extending away from the module along a direction perpendicular to the longitudinal direction.

8. The temperature probe of claim 1, wherein the module comprises an overmolded silicon rubber.

9. The temperature probe of claim 1, wherein the module is hermetically sealed.

10. A temperature probe for a cooktop appliance, comprising:
   a resilient clip configured to engage a rim of a cooking utensil;
   a module connected to the resilient clip;
   a temperature sensor extending from the module along a longitudinal direction;
   a wireless communication module configured for wireless communication with the cooktop appliance;
   a battery; and
   an inductive charging coil electrically coupled to the battery for wirelessly charging the battery.

11. The temperature probe of claim 10, wherein the temperature probe is configured for non-contact measurement of a diameter of the cooking utensil.

12. The temperature probe of claim 10, wherein temperature probe comprises an emitter configured to emit a wave and a receiver configured to receive a reflection of the wave, wherein the temperature probe further comprises a controller configured to determine a diameter of the cooking utensil based on a difference between the emitted wave and the received reflection.

13. The temperature probe of claim 10, wherein the module is connected to the resilient clip by a threaded fastener, the threaded fastener comprising a knob extending away from the module along a direction perpendicular to the longitudinal direction.

14. The temperature probe of claim 10, wherein the resilient clip comprises a hook portion configured to engage the rim of the cooking utensil and an offset portion that is not parallel to the hook portion.

15. The temperature probe of claim 10, wherein the resilient clip comprises a spring steel material.

16. The temperature probe of claim 10, wherein the module comprises an overmolded silicon rubber.

17. The temperature probe of claim 10, wherein the module is hermetically sealed.

\* \* \* \* \*